US008062985B2

(12) United States Patent
Collier et al.

(10) Patent No.: US 8,062,985 B2
(45) Date of Patent: Nov. 22, 2011

(54) FLEXIBLE COMPOSITE MULTIPLE LAYER FIRE-RESISTANT INSULATION STRUCTURE

(75) Inventors: Robert P Collier, Gahanna, OH (US); Brian P O'Riordan, Ashville, OH (US); Thomas P. McGuire, Laurelville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 792 days.

(21) Appl. No.: 11/927,268

(22) Filed: Oct. 29, 2007

(65) Prior Publication Data

US 2009/0140097 A1    Jun. 4, 2009

Related U.S. Application Data

(60) Provisional application No. 60/919,987, filed on Mar. 26, 2007.

(51) Int. Cl.
*B32B 3/02* (2006.01)
*B32B 5/26* (2006.01)
*B32B 15/14* (2006.01)
*B32B 27/12* (2006.01)

(52) U.S. Cl. ........ 442/277; 442/232; 442/234; 442/235; 442/283; 442/286; 442/301; 428/70; 428/74; 428/76

(58) Field of Classification Search .................. 442/228, 442/232, 234, 235, 238, 268, 271, 273, 275, 442/277, 278, 283, 286, 301; 428/70, 74, 428/76
See application file for complete search history.

(56) References Cited

U.S. PATENT DOCUMENTS

| 4,243,715 A | 1/1981 | Gordon |
| 4,472,328 A | 9/1984 | Sugimoto et al. |
| 4,522,673 A | 6/1985 | Fell et al. |
| H140 H | 10/1986 | Bruns et al. |
| 4,777,073 A | 10/1988 | Sheth |

(Continued)

FOREIGN PATENT DOCUMENTS

WO    WO 94/25180    11/1994

(Continued)

OTHER PUBLICATIONS

Tran, Khang D.—Light Weight Fire Barrier Materials for Aircraft Fuselage Thermal/Acoustical Insulation, 2001, The Mexmil Company, Santa Ana, California, USA.

(Continued)

*Primary Examiner* — Jenna Johnson
(74) *Attorney, Agent, or Firm* — Calfee, Halter & Griswold LLP (57) ABSTRACT

A flexible composite multiple layer fire-resistant insulation structure has a primary facing surface and a secondary facing surface. There is at least one dimensionally stable membrane having a primary membrane surface and a secondary membrane surface. At least a portion of the secondary facing surface is attached to the primary membrane surface. There is also at least one lofted insulative layer having a primary insulative surface and a secondary insulative surface. The at least one woven fabric facing layer may be formed of various materials, including amorphous silica glass and S-glass fiberglass. Different weaving patterns may be used to weave the facing layer. The facing layer may include a fire resistive treatment, which may in turn include a phosphate containing compound, and more particularly, may include dicalcium phosphate. In certain embodiments, multiple layers of the above are provided, and the structure may be enclosed in an abrasion resisting sheath.

23 Claims, 8 Drawing Sheets

U.S. PATENT DOCUMENTS

| | | | |
|---|---|---|---|
| 4,943,465 | A | 7/1990 | Bailey et al. |
| 5,032,446 | A | 7/1991 | Sayles |
| 5,038,693 | A | 8/1991 | Kourtides et al. |
| 5,284,700 | A | 2/1994 | Strauss et al. |
| 5,308,692 | A | 5/1994 | Kennedy et al. |
| 5,401,588 | A | 3/1995 | Garvey et al. |
| 5,569,423 | A | 10/1996 | Belunova et al. |
| 5,624,726 | A * | 4/1997 | Sanocki et al. ............... 428/74 |
| 5,654,060 | A | 8/1997 | Holman et al. |
| 5,658,972 | A | 8/1997 | Grzybowski et al. |
| 5,687,517 | A | 11/1997 | Wiercinski et al. |
| 5,766,745 | A | 6/1998 | Smith et al. |
| 5,767,024 | A * | 6/1998 | Anderson et al. ............ 442/378 |
| 5,788,184 | A | 8/1998 | Eddy |
| 5,837,626 | A | 11/1998 | McCullough |
| 5,858,530 | A | 1/1999 | McCullough, Jr. |
| 5,965,257 | A | 10/1999 | Ahluwalia |
| 6,114,003 | A | 9/2000 | Gottfried |
| 6,297,178 | B1 | 10/2001 | Berbner et al. |
| 6,308,482 | B1 | 10/2001 | Strait |
| 6,358,591 | B1 * | 3/2002 | Smith ........................... 428/74 |
| 6,383,623 | B1 | 5/2002 | Erb, Jr. |
| 6,500,560 | B1 | 12/2002 | Kiik et al. |
| 6,551,951 | B1 * | 4/2003 | Fay et al. ....................... 442/82 |
| 6,565,040 | B2 | 5/2003 | Fay et al. |
| 6,579,396 | B2 | 6/2003 | Erb, Jr. |
| 6,586,353 | B1 | 7/2003 | Kiik et al. |
| 6,627,561 | B1 | 9/2003 | Wulliman et al. |
| 6,641,896 | B2 | 11/2003 | Fensel et al. |
| 6,670,291 | B1 | 12/2003 | Tompkins et al. |
| 6,720,067 | B2 | 4/2004 | Takahashi et al. |
| 6,811,649 | B2 | 11/2004 | Pfeffer |
| 6,844,057 | B2 | 1/2005 | DiChiara, Jr. |
| 6,844,091 | B2 | 1/2005 | Denham et al. |
| 6,884,321 | B2 | 4/2005 | Erb, Jr. et al. |
| 6,925,766 | B2 | 8/2005 | Di Pede |
| 6,971,742 | B2 | 12/2005 | Nelson |
| 6,998,361 | B2 | 2/2006 | Lewis |
| 7,115,313 | B2 | 10/2006 | Zanchetta et al. |
| 7,132,143 | B2 | 11/2006 | Zanchetta et al. |
| 7,189,671 | B1 | 3/2007 | Lewis |
| 7,521,385 | B2 | 4/2009 | Ahluwalia |
| 7,563,733 | B2 | 7/2009 | Ahluwalia et al. |
| 7,634,877 | B2 | 12/2009 | Wiercinski |
| 2002/0081924 | A1 | 6/2002 | Fensel et al. |
| 2003/0054717 | A1 | 3/2003 | Ahluwalia |
| 2003/0148693 | A1 | 8/2003 | Erb, Jr. et al. |
| 2003/0170418 | A1 | 9/2003 | Mormont et al. |
| 2003/0176125 | A1 | 9/2003 | Ahluwalia |
| 2003/0224679 | A1 | 12/2003 | Ahluwalia |
| 2003/0228460 | A1 | 12/2003 | Ahluwalia |
| 2004/0016502 | A1 | 1/2004 | Jones |
| 2004/0055240 | A1 | 3/2004 | Kiik et al. |
| 2004/0071927 | A1 | 4/2004 | Murphy et al. |
| 2004/0116022 | A1 | 6/2004 | Langley et al. |
| 2004/0121152 | A1 | 6/2004 | Toas |
| 2004/0132364 | A1 | 7/2004 | Wulliman et al. |
| 2004/0148887 | A1 | 8/2004 | Di Pede |
| 2004/0161569 | A1 | 8/2004 | Zanchetta et al. |
| 2004/0161570 | A1 | 8/2004 | Zanchetta et al. |
| 2004/0247819 | A1 | 12/2004 | Khieu et al. |
| 2005/0031843 | A1 | 2/2005 | Robinson et al. |
| 2005/0097857 | A1 | 5/2005 | Mehta et al. |
| 2005/0171223 | A1 | 8/2005 | Thagard, III et al. |
| 2005/0208851 | A1 | 9/2005 | Gooliak |
| 2005/0236606 | A1 | 10/2005 | Toas et al. |
| 2006/0019102 | A1 | 1/2006 | Kanakarajan |
| 2006/0046598 | A1 | 3/2006 | Shah |
| 2006/0078753 | A1 | 4/2006 | Bomberg et al. |
| 2006/0118992 | A1 | 6/2006 | Chang et al. |
| 2006/0228963 | A1 | 10/2006 | Souther et al. |
| 2006/0286347 | A1 | 12/2006 | Mehta et al. |
| 2007/0014979 | A1 | 1/2007 | Bullock et al. |
| 2007/0014995 | A1 | 1/2007 | Chacko et al. |
| 2007/0044397 | A1 | 3/2007 | Wiercinski et al. |
| 2007/0044407 | A1 | 3/2007 | Elliott |
| 2007/0178784 | A1 | 8/2007 | Jones et al. |
| 2008/0155923 | A1 | 7/2008 | Teng et al. |
| 2008/0166533 | A1 | 7/2008 | Jones et al. |
| 2008/0227353 | A1 | 9/2008 | Klingelhage et al. |
| 2008/0289289 | A1 | 11/2008 | Wiercinski et al. |
| 2009/0042471 | A1 | 2/2009 | Cashin et al. |

FOREIGN PATENT DOCUMENTS

| | | |
|---|---|---|
| WO | WO 98/31537 | 7/1998 |
| WO | 08/118732 | 10/2008 |

OTHER PUBLICATIONS

International Search Report dated Jul. 1, 2008 in PCT/US2008/057609.

Federal Register, 14 CFR Parts 25, 91 et al., "Improved Flammability Standards for Thermal/Acoustic Insulation Materials Used in Transport Category Airplanes", Final Rule, Jul. 31, 2003.

* cited by examiner

FLEXIBLE COMPOSITE MULTIPLE LAYER FIRE-RESISTANT INSULATION STRUCTURE

RELATED PATENT APPLICATIONS

This patent application claims the benefit of priority of U.S. provisional patent application Ser. No. 60/919,987, filed Mar. 26, 2007, entitled IMPROVED AIRCRAFT INSULATION.

TECHNICAL FIELD AND INDUSTRIAL APPLICABILITY OF THE INVENTION

The invention relates to the field of thermal and acoustic insulation, in particular, to a flexible composite multiple layer fire-resistant insulation structure capable of meeting and exceeding current fire resistance regulations for such products.

BACKGROUND OF THE INVENTION

Many structures, particularly aircraft, require insulation that is both strong and light, and exhibits excellent thermal and acoustic insulative properties. In particular, it is known that a particular type of insulation had excellent characteristics and performance, other than for high heat resistance, for aircraft applications. Such insulation is a rotary fiberized glass insulation, the nature and manufacture of being fully described in U.S. Patent Publication 20070014995, which is fully incorporated herein as if fully rewritten.

In summary, this product and process includes the step of fiberizing molten glass, spraying binder onto the fibers, forming a single component fibrous glass insulation pack on a moving conveyor, and curing the binder on the fibrous glass insulation pack to form an insulation blanket.

More specifically, the glass is first melted in a tank and then supplied to a fiber forming device such as a fiberizing spinner. The spinner is rotated at a high speed so that centrifugal force causes the molten glass to pass through holes in the sidewalls of the spinner to form glass fibers. Single component glass fibers of random lengths may be attenuated from the fiberizing spinner and blown generally downwardly, that is, generally perpendicular to the plane of the spinner by blowers positioned within a forming chamber.

The blowers turn the fibers down to form a veil or curtain. The glass fibers may have a fiber diameter of from about 2 to about 9 microns and a length of from about ¼ inch to about 4 inches. The small diameter of the glass fibers of the insulation as described below helps give the final insulation element a soft feel.

The glass fibers, while still hot from the drawing operation, are sprayed with an aqueous binder composition incorporating an appropriate conventional binder as described above. The glass fibers, with the uncured resinous binder adhered thereto, are then gathered and formed into an uncured insulation pack on an endless forming conveyor within the forming chamber with the aid of a vacuum drawn through the insulation pack from below the forming conveyor. The residual heat from the glass fibers and the flow of air through the insulation pack during the forming operation are generally sufficient to volatilize the majority of the water from the binder before the glass fibers exit the forming chamber, thereby leaving the remaining components of the binder on the fibers as a viscous or semi-viscous high-solids liquid.

The coated insulation pack, which is in a compressed state due to the flow of air through the pack, is then transferred from the forming chamber under exit rollers to a transfer zone where the insulation pack vertically expands due to resiliency of the glass fibers. The expanded insulation pack is the heated, such as by conveying the pack though a curing oven where heated air is blown through the insulation pack to evaporate any remaining water in the binder, cure the binder and residually bond the fibers together.

The cured binder imparts strength and resiliency to the insulation blanket. It is anticipated that the drying and curing of the binder may be carried out in either one or two different steps. If desired, the insulation pack may be compressed by upper and lower oven conveyors in the curing oven in order to form a fibrous insulation blanket of desired thickness. The curing oven may be operated at temperatures from, for example, about 200 to about 325 degrees Celsius. The insulation pack remains within the oven for a period of time sufficient to cross link the binder and form the insulation blanket. Typical residence times in the oven are in the range of about 30 seconds to about 3 minutes. After cooling, the insulation blanket may be rolled by a roll-up device for shipping or for storage for use at a later time. Alternately, the insulation element may be cut to size from the blanket.

If desired, the insulation blanket may be subsequently subjected to an optional needling process in which barbed needles are pushed in a downward and upward motion through the fibers of the insulation blanket to entangle or intertwine the fibers and impart increased mechanical strength and integrity. Needling the insulation blanket also increases the density and reduces the overall thickness of the blanket. The needling process or needle piercing may take place with or without a precursor step of lubricating.

In an alternative approach, glass fibers are processed without adding any aqueous binder composition. In this instance, the glass fibers are bound together using mechanical means including but not limited to needling, stitching and hydroentangling. Further, facings of, for example, glass mat and/or metal foils may be used on one or both sides to secure the fibers for encapsulation.

However, it is well-known in the art that fiberglass products are susceptible to melting and burn-through at high temperatures. Fire is among the deadliest of all possible aircraft tragedies. It is not uncommon for passengers on airplanes to survive an airplane accident, such as crashes, only to perish in the fire that often follows. Such fires may be fueled by spilled jet fuel from ruptured tanks and fuel lines, and is known to burn at temperatures exceeding about 1900 degrees Fahrenheit. Under such heat, the solid aluminum skin of an aircraft may melt in less than about 45 seconds, leaving any survivors directly exposed to such obviously fatal heat.

In an attempt to provide protection, airplanes are typically insulated with composite insulating structures. These structures are placed in assemblies between the structural struts of the aircraft, between the outer airplane skin and the inner passenger surface. Such assemblies typically comprise one more layers of insulating materials, typically with a heat resistive layer at, or near, the aircraft skin. To prevent moisture from entering the insulating material, and to decrease mechanical damage to the insulating material, the assemblies are typically enclosed in a polymer bag.

The FAA has mandated standards for aircraft fire resistance. The FAA test requirements are defined in the Federal Register/Volume 68, No. 147 dated Jul. 31, 2003; 14 C.F.R. Parts 25, 91, 121, 125, and 135; "Improved Flammability Standards for Thermal/Acoustic Insulation Materials Used in Transport Category Airplanes." In summary; the FAA is adopting upgraded flammability standards for thermal and acoustic insulation materials used in transport category airplanes. These standards include new flammability tests and criteria that address flame propagation and entry of an external fire into the airplane. For airplanes with a passenger capacity of 20 or greater, this final rule requires insulation materials installed in the lower half of the airplane to pass a test of resistance to flame penetration. The test involves exposing samples of thermal/acoustic insulation blankets mounted in a test frame to a burner for four minutes. The insulation blankets must prevent flame penetration for at least four minutes and must limit the amount of heat that passes through the blanket during the test. See final part VII of Appendix F to of 14 C.F.R. Part 25 for more details. The temperature of the flame to which the insulation is exposed is 1900° F., and the maximum allowable heat flux measured on the back side of the test sample during the four minute test is 2 Btu/sq ft-sec.

Various prior art methods have been used, generally with limited success, to meet these FAA requirements, as well as to satisfy the additional acoustic demands made on such insulation.

Numerous methods and structures may provide fire resistance at relatively low temperatures. It has proven considerably more difficult to provide fire resistance to the current level of FAA testing. Additionally, it is noteworthy that fire resistance requires performance involving factors other than pure heat resistance. It is well known that many high-temperature materials become extremely brittle when heated, and the turbulence produced in a real-world fire can be sufficient to destroy the structural integrity of those materials. For example, U.S. Pat. No. 5,766,745 ('745) teaches a carbonaceous textile composite material that was tested to a level of 1000 degrees Celsius, but using a non-turbulent radiant heat plate.

A typical attempt to provide the fire resistance needed in this and similar applications has been to combine a ceramic paper layer with a fibrous layer, for example as taught in U.S. Pat. No. 6,670,291 ('291). Such ceramic papers have inherently low flexibility, and must be made relatively thin, such as the 200 to 450 micron thickness taught as ideal in the '291 patent, and must be kept thin in order to provide acceptable bending parameters. An even thinner fire-resistant aramid-ceramic layer, only 3 to 5 mils thick, is disclosed in U.S. Publ. No. 2006/0046598. These inherently delicate ceramic papers must generally be reinforced with a separate scrim layer to increase the durability of the resultant product.

Another attempt to create an acceptable product in the prior art may be seen in U.S. Pat. No. 6,565,040 ('040). The '040 device uses a multi-layer composite structure where the high temperature resistance is providing by coating or interleaf barrier layer or layers including a reflective plate-like mineral, such as but not limited to vermiculite, applied in a coating to or incorporated into one or both major surfaces of a sheet, such as a paper sheet, an organic fiber mat, a glass fiber mat, or a fabric sheet. Such reflective plate-like minerals again bring with them the inherent disadvantage of weight and brittleness.

Contemplation of the demands of such fire-resistant applications led to the following conclusions: a successful product must display suitable thermal and acoustic insulative properties; must be of high durability; should be of light weight; and should ideally be both dimensionally stable and suitable for mass-production methods, such as die-cutting of component parts. Additionally, all of these requirements must be accomplished at commercially reasonable cost. The instant invention solves these, and many other concerns and problems reflected in the prior art, in a unique and innovative manner.

SUMMARY OF THE INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

The present invention includes a flexible composite multiple layer fire-resistant insulation structure the instant invention having at least one woven fabric facing layer having a primary facing surface and a secondary facing surface. There is at least one dimensionally stable membrane having a primary membrane surface and a secondary membrane surface. At least a portion of the secondary facing surface is attached to the primary membrane surface. There is also at least one lofted insulative layer having a primary insulative surface and a secondary insulative surface.

The at least one woven fabric facing layer may be formed of various materials, including amorphous silica glass and S-glass fiberglass; and different weaving patterns may be used to weave the facing layer. The facing layer may include a fire resistive treatment, which may in turn include a phosphate containing compound, and more particularly, may include dicalcium phosphate.

In certain embodiments, an adhesive layer may adhere at least a portion of the membrane insulative layer, which maybe formed of various fiberglass material, as well as foam materials. There maybe multiple layers as described above, particularly in embodiments designed to make it possible to have either side of the structure facing an expected thermal challenge.

BRIEF DESCRIPTION OF THE DRAWINGS

Without limiting the scope of the present invention as claimed below and referring now to the drawings and figures, all of which are not to scale:

These drawings are provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION AND PREFERRED EMBODIMENTS OF THE INVENTION

Figure 1:
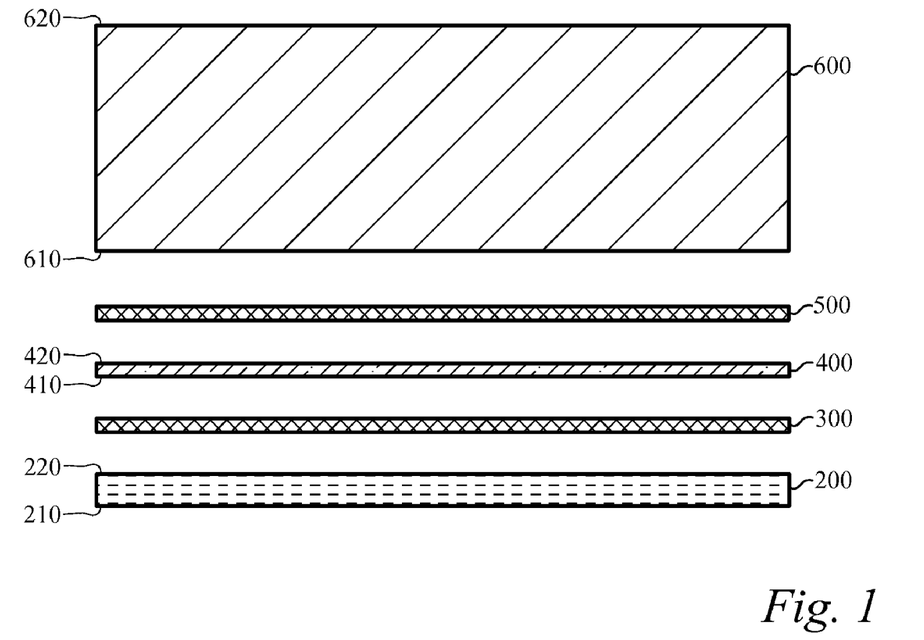
FIG. 1 is an exploded cross-sectional drawing of an embodiment of a structure of the instant invention.
Figure 2:
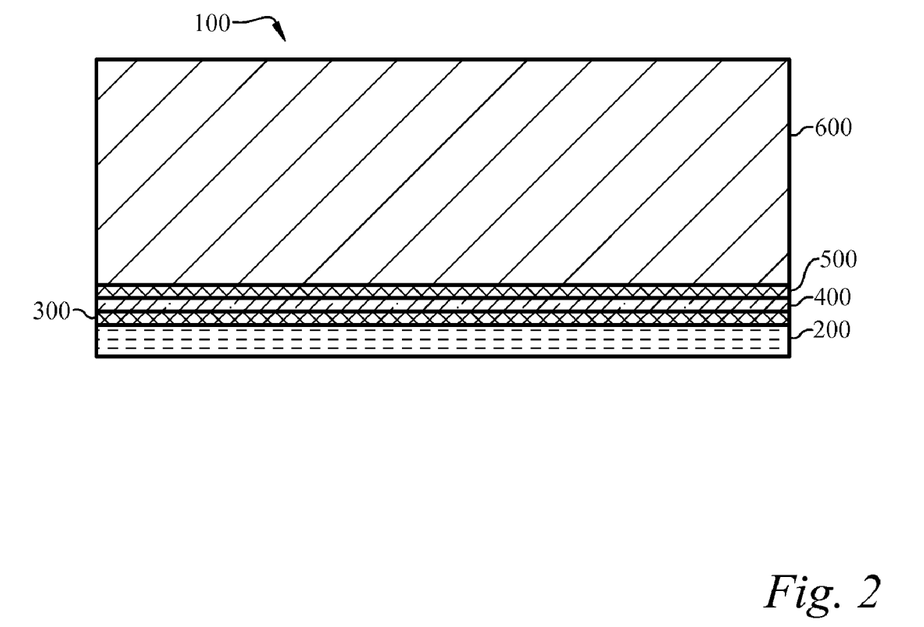
FIG. 2 is a cross-section drawing of the embodiment of FIG. 1, showing the layers of the structure in assembled position.
Figure 3:
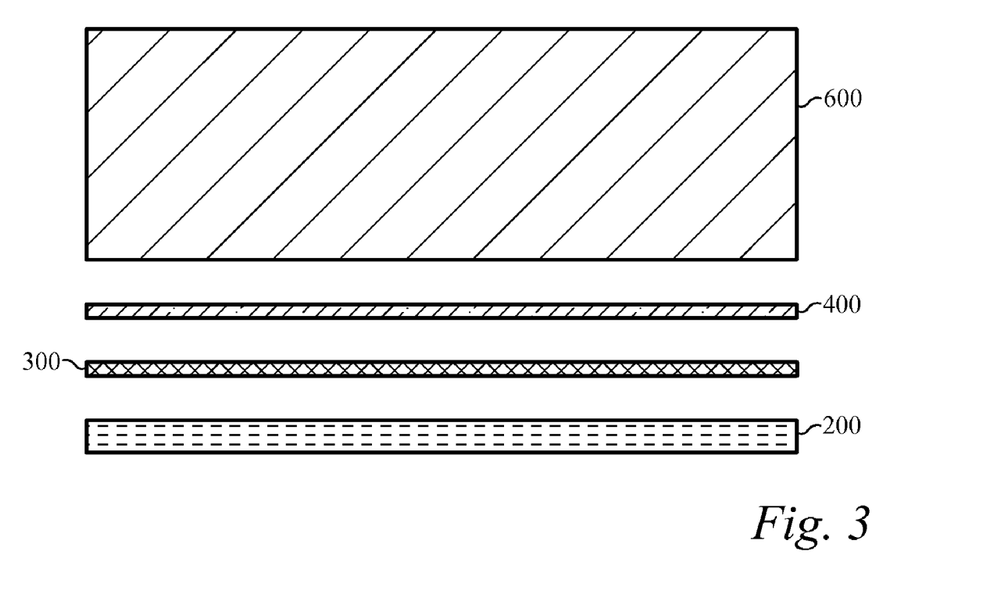
FIG. 3 is an exploded cross-sectional drawing of an alternate embodiment of a structure of the instant invention.
Figure 4:
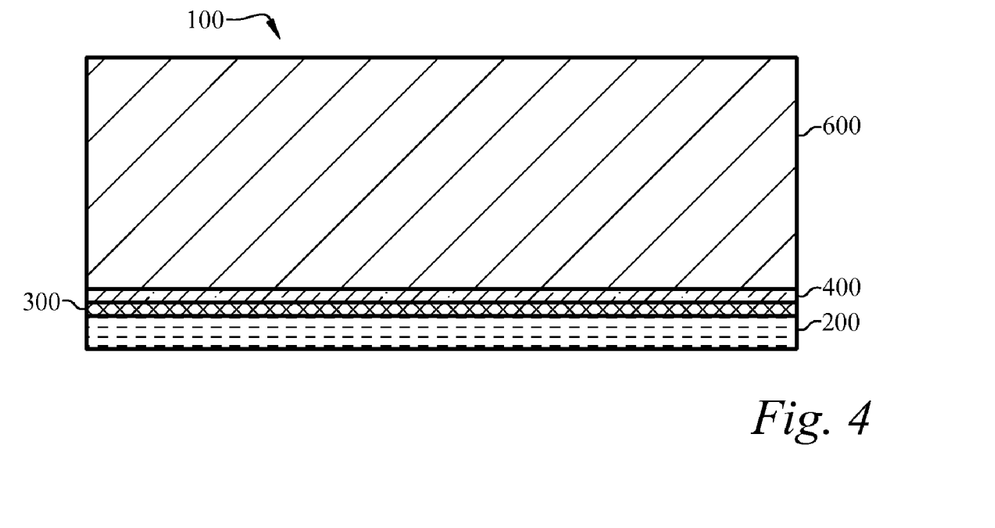
FIG. 4 is a cross-section drawing of the embodiment of FIG. 3, showing the layers of the structure in assembled position.

With reference generally now to FIGS. 1 through 11, the instant invention includes a a flexible composite multiple layer fire-resistant insulation structure (100). The structure (100), in one embodiment seen in FIGS. 1-2 has at least one woven fabric facing layer (200) having a primary facing surface (210) and a secondary facing surface (220). There is also, as seen in FIGS. 1-2, at least one dimensionally stable membrane (400) having a primary membrane surface (410) and a secondary membrane surface (420). For the purposes of this disclosure, dimensionally stable means that the dimensions remain relatively constant with changes in temperature, humidity or mechanical stress. At least a portion of the secondary facing surface (220) is attached to the primary membrane surface (410). There is also at least one lofted insulative layer (600) having a primary insulative surface (610) and a secondary insulative surface (620).

In one embodiment, at least 10% of the secondary facing surface (220) is attached to the primary membrane surface (410). In another embodiment at least 30% of the secondary facing surface (220) is attached to the primary membrane surface (410). In yet another embodiment, at least 70% of the secondary facing surface (220) is attached to the primary membrane surface (410). As the nature of the secondary facing surface (220) is not smooth, that is, it is woven; adhering the woven secondary facing surface (220) to a possibly smooth primary membrane surface (410) surface may require that a certain percentage of the surfaces be attached to one another for structural integrity of the structure (100). Additionally, having a certain percentage of these surfaces attached to one another provides a more stable structure that is more susceptible to certain mass-production methods, such as die-cutting.

In an alternative embodiment, less than about 10% of the secondary facing surface (220) may be attached to the membrane surface (410).

The at least one woven fabric facing layer (200) may be formed of various materials. In one embodiment the at least one woven fabric facing layer (200) includes amorphous silica glass. In another embodiment, the at least one woven fabric facing layer (200) further includes S-glass.

Different weaving patterns maybe used to form the at least one woven facing layer (200). These patterns may be a plain weave 1×1 weave pattern, but may also include at least a 2×1 weave pattern or 3×1 or higher weave pattern, known in the art as "crowfoot patterns." Exemplars of these patterns are illustrated at FIGS. 8-11.

In different embodiments, and as described in detail above, the at least one woven fabric facing layer (200) further includes a fire resistive treatment, which may in turn include a phosphate containing compound, and more particularly, may include dicalcium phosphate. In alternate embodiments, the fire resistant treatment further includes at least one application of an intumescent material. Examples of the intumescent materials are taught in the '700 patent, col. 3, lines 25-65 to col. 4, lines 1-45, which is herein incorporated by reference in its entirety.

In certain embodiments, seen in FIGS. 1-2, an adhesive layer (300) may adhere at least a portion of the secondary membrane surface (420) to the primary insulative surface (610). The at least one membrane (400) may, in some embodiments, further include at least one metallic sheet layer, or may also include at least one polymeric layer.

The at least one lofted insulative layer (600) may be formed of various materials. the at least one lofted insulative layer may include a fiberglass material, including but not limited rotary fiberized glass, and as well as may include a foam material. In certain embodiments, the flexible composite multiple layer fire-resistant insulation structure is at least partially enclosed within the sheath volume (710) of a sheath (700). The sheath (700) may contribute mechanical and moisture protection to the structure (100), and sheath mounting tabs (720) may facilitate mounting the structure (100) to any structural elements required.

Figure 5:
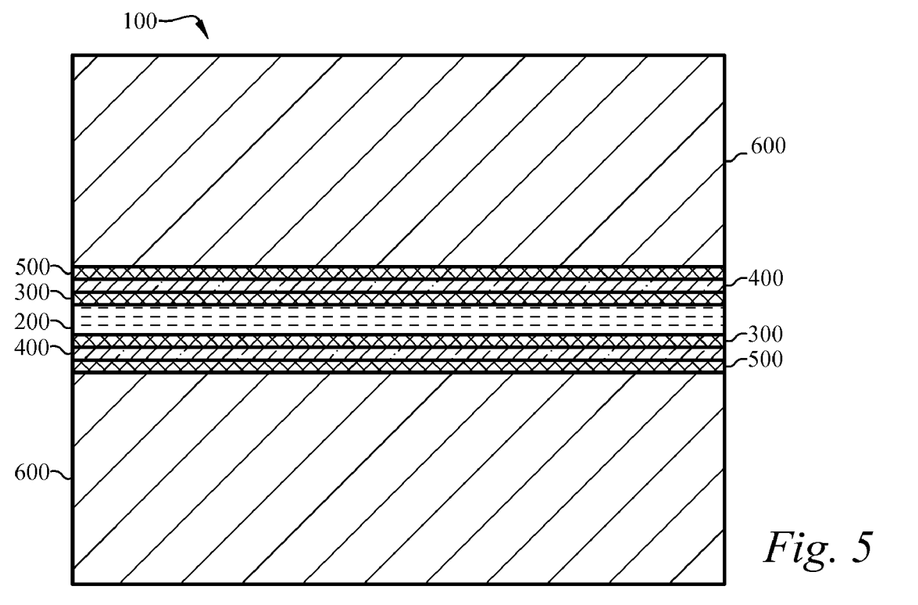
FIG. 5 is a cross-section drawing of an alternate embodiment of a structure of the instant invention showing the layers of the structure in assembled position.
Figure 5A:
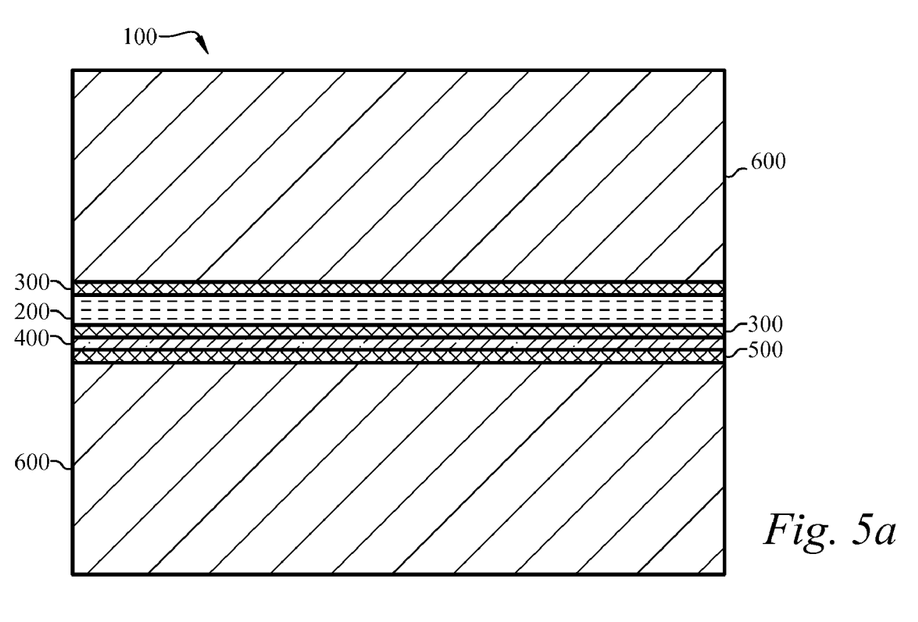
Figure 6:
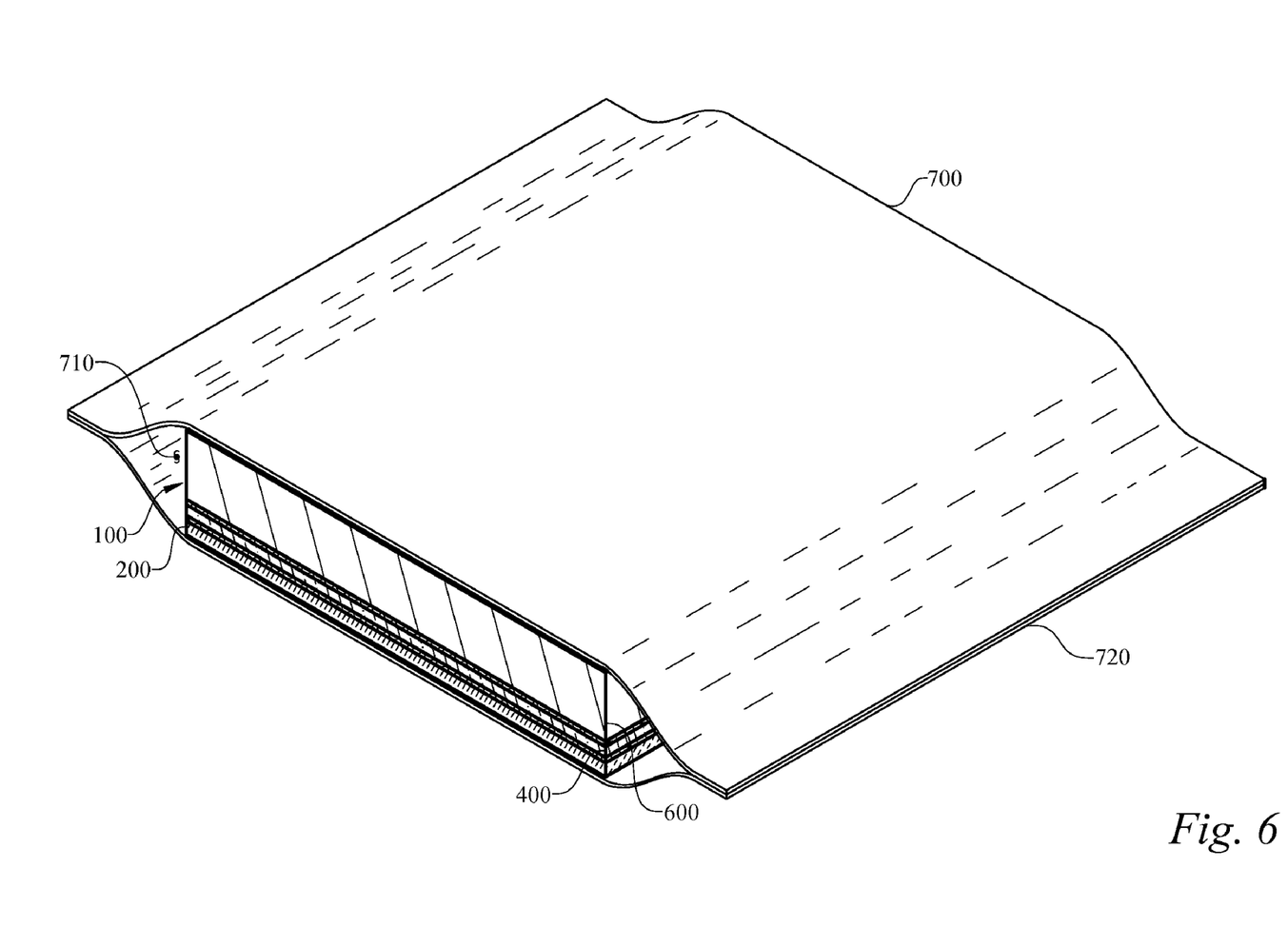
FIG. 6 is an elevated perspective drawing of the embodiment of FIG. 1, showing the layers of the structure in assembled position and the structure enclosed in a protective enclosure.

In another embodiment, as shown in FIG. 5A, a flexible composite multiple layer burn-through resistant insulation structure (100), includes at least the following: at least a first lofted insulative layer (600), positioned adjacent to at least a dimensionally stable membrane (400) positioned adjacent to at least a first woven fabric facing layer (200). The at least a first woven fabric facing layer (200) is positioned adjacent to at least a second lofted insulative layer (600). Adhesive layer (300) may adhere lofted insulative layer (600) to the first woven fabric facing layer (200). Adhesive layer (300) may also adhere first woven fabric facing layer (200) to the stable membrane (400). Further adhesive layer (300) may adhere the stable membrane (400) to the second lofted insulative layer (600).

Figure 7:
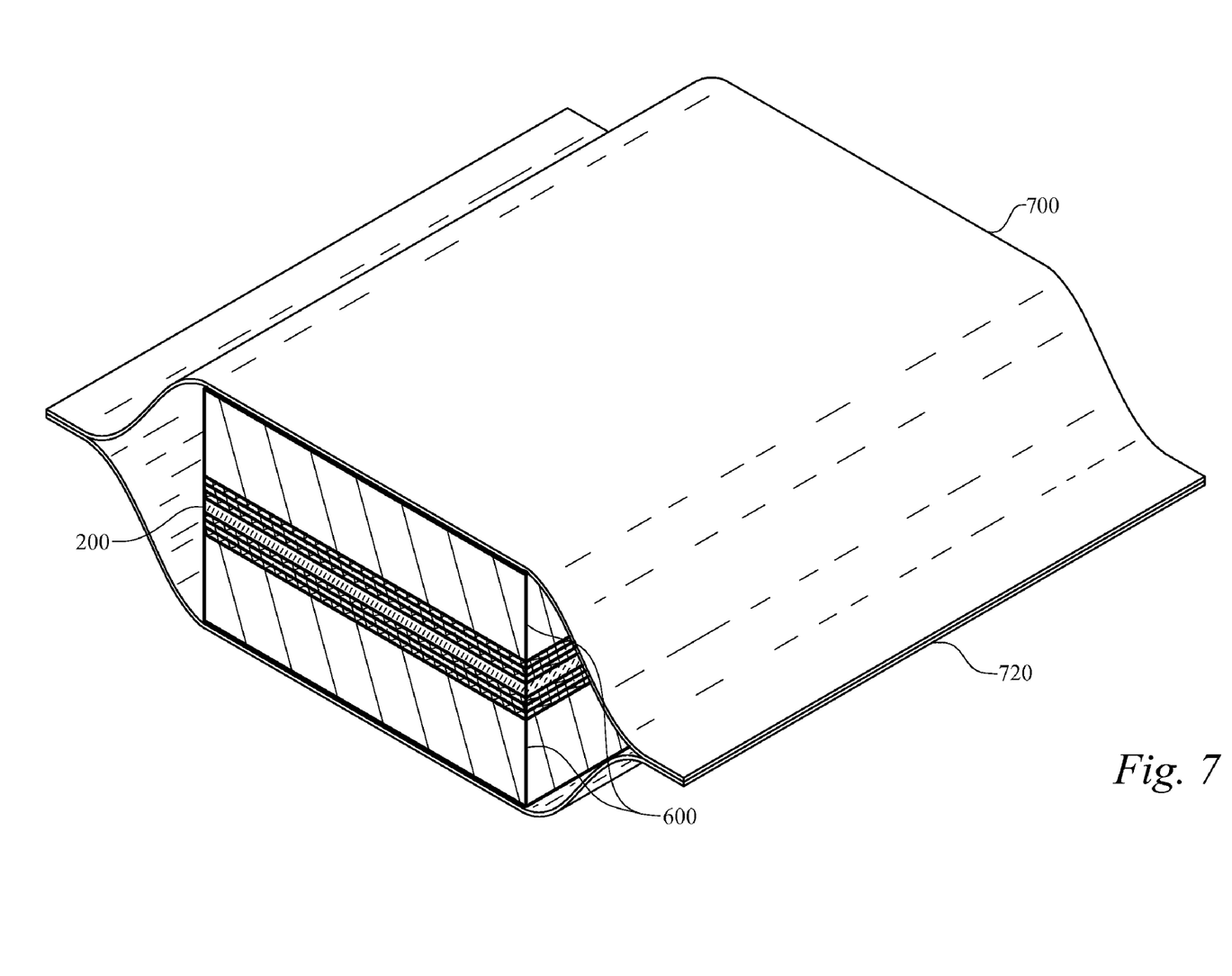
FIG. 7 is an elevated perspective drawing of the embodiment of FIG. 5, showing the layers of the structure in assembled position and the structure enclosed in a protective enclosure.
Figure 8:
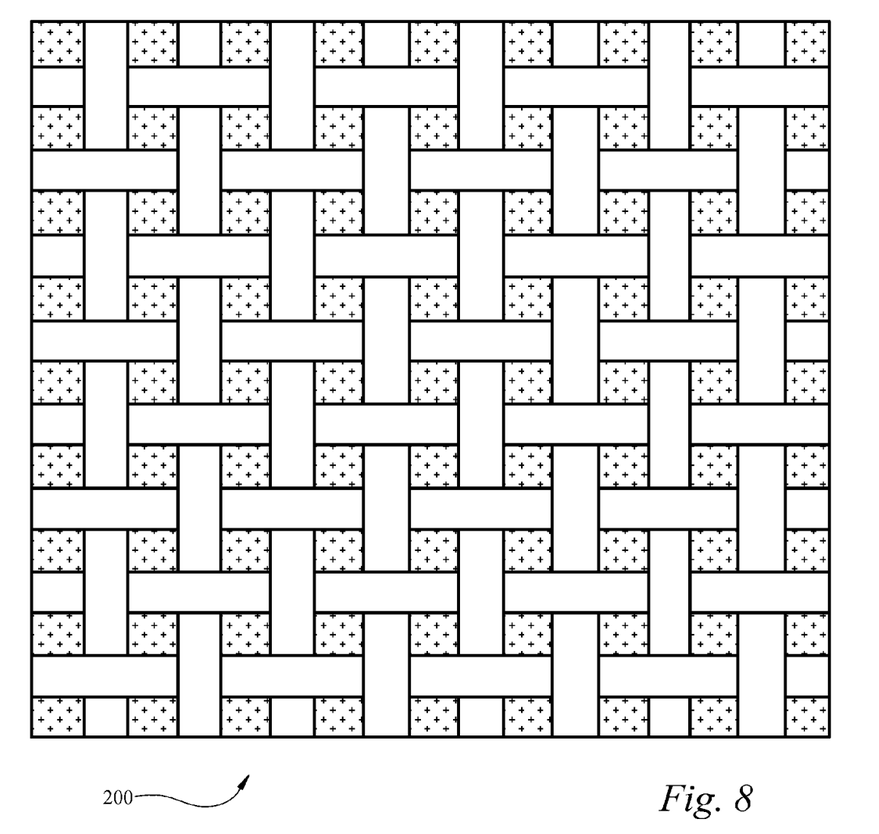
FIG. 8 is a top plan view of an embodiment of the instant invention, showing a plain weave over under weave pattern.
Figure 9:
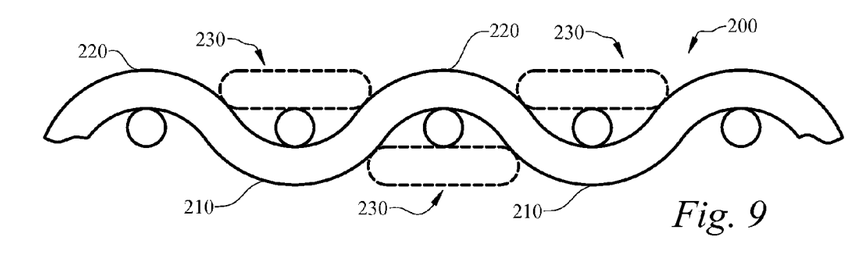
FIG. 9 is cross sectional view of the embodiment of FIG. 8.

In another embodiment, as shown in FIG. 5, a flexible composite multiple layer burn-through resistant insulation structure (100), includes at least the following: at least a first lofted insulative layer (600), positioned adjacent to at least a dimensionally stable membrane (400) positioned adjacent to at least a first woven fabric facing layer (200). The at least a first woven fabric facing layer (200) is positioned adjacent to at least a second dimensionally stable membrane (400), which is in turn positioned adjacent to at least a second lofted insulative layer (600). Adhesive layer (300) may adhere lofted insulative layer (600) to the first woven fabric facing layer (200). Adhesive layer (300) may also adhere first woven fabric facing layer (200) to the stable membrane (400). Further adhesive layers (300), (500), may adhere the stable membrane (400) to the woven fabric facing layer (200) and the second lofted insulative layer (600). Such a structure (100) is seen in FIG. 7, shown enclosed in a protective sheath (700).

In another embodiment, a flexible composite multiple layer burn-through resistant insulation structure, includes at least the following: at least a first lofted insulative layer (600), positioned adjacent to at least a dimensionally stable membrane (400) positioned adjacent to at least a first woven fabric facing layer (200). The at least a first woven fabric facing layer (200) is positioned adjacent to at least a second dimensionally stable membrane (400), which is in turn positioned adjacent to at least a second lofted insulative layer (600). Such a structure (100) is seen in FIG. 7, shown enclosed in a protective sheath (700).

One skilled in the art will realize that the embodiments of the instant invention seen in FIGS. 1-6 are optimally functional only if the woven fabric facing layer (200) is the side facing the thermal challenge. Therefore, if the structure were installed backwards, the fiberglass would be less effective. One will observe that the structure (100) as described immediately above and illustrated in FIG. 7 is essentially symmetrical in that regard. It may be installed, and would be equally effective, regardless of which side of the structure were facing thermal challenge.

Figure 12:
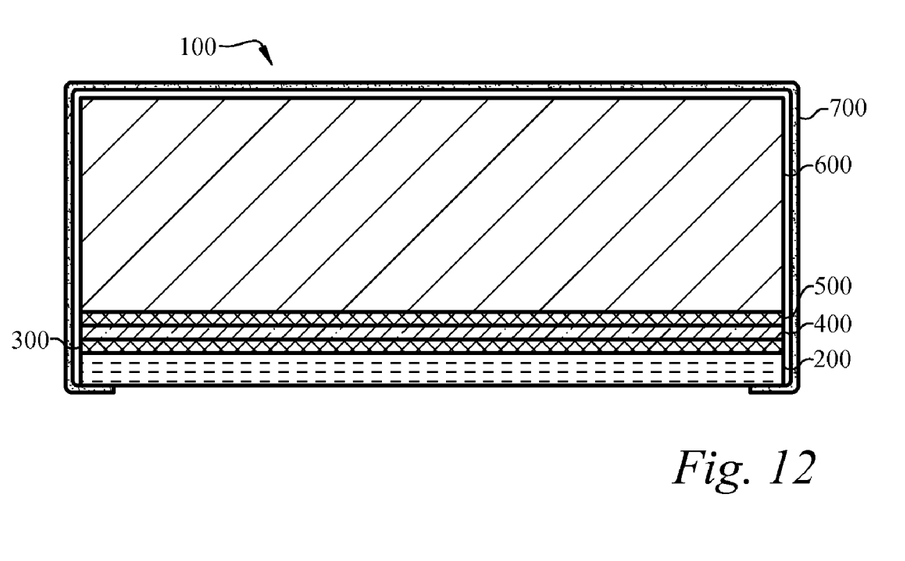
FIG. 12 is a cross-sectional view of an embodiment of a structure of the instant invention enclosed in a sheath.

In one embodiment, as shown in FIG. 12, the flexible composite multiple layer burn-through resistant insulation structure (100) is enclosed in a protective sheath (700) which is laminated by heat to the woven fabric facing layer (200). The sheath (700) may be loosely fitted around the blanket or may be taut.

In a particular embodiment, the instant invention is a flexible composite multiple layer fire-resistant insulation structure (100) for increasing the burn through resistance of an aircraft fuselage having an exterior aspect and an interior aspect. In such an embodiment, the invention includes a composite structure (100) having a woven fabric facing layer (200) adjacent to the fuselage exterior aspect, and a lofted insulative layer (600) adjacent to the fuselage interior aspect. The woven fabric facing layer (200) and the lofted insulative layer (600) are separated by a dimensionally stable membrane (400).

In such an embodiment, the facing layer (200) and the membrane (400) may be adhered to each other, or alternately, the facing layer (200) and the membrane (400) are adhered to each other, and the membrane (400) and the lofted insulative layer (600) are adhered to each other.

Again, various materials may be used to form such embodiments. The facing layer (200) may include a bidirectional woven fabric having S-glass fiberglass running in both directions of the weave, as seen in FIGS. 8-11. The fabric facing layer (200) may further include a phosphate containing compound.

In certain embodiments, there may be an aircraft fuselage having an outer surface, a plurality of structural members, and an inner surface. There may be a flexible composite multiple layer fire-resistant insulation structure (100) disposed between the fuselage outer surface and the fuselage inner surface and substantially filling the space between at least two structural members. The structure (100) may further have a woven fabric facing layer (200) disposed towards the fuselage outer surface; and a lofted insulative layer (600) disposed towards the fuselage inner surface. There may be a dimensionally stable membrane (400) adjacent to at least one layer chosen from the layers consisting of the facing layer (200) and the lofted insulative layer (400).

The instant invention is clearly susceptible to a plurality of methods of manufacture. One such method may include the following: Providing a woven fabric outer layer having an outer facing surface and an inner facing surface and applying a high-phosphate heat-resistive treatment to at least one surface of the woven fabric outer layer. Next, one may dispose a dimensionally stable membrane having an outer film surface and a film inner surface such that the outer film surface is disposed on the inner facing surface. Next, a lofted insulative layer having an outer insulative surface and an inner insulative surface may be disposed such that the outer insulative surface layer is disposed on the inner film. Lastly, the woven fabric, dimensionally stable membrane, and lofted insulative layer may be disposed in an abrasion resisting outer covering.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

The following composite insulation materials were exposed to a 2000 degree Fahrenheit flame in a modified ASTM E119 test facility, and observed for burn-through. The results are presented in tabular form in Table 1.

TABLE 1

| Test Material | Burn-Through Time | Material Weight lb/ft$^2$ | Comments |
| --- | --- | --- | --- |
| 1 | 14-58 sec. | 0.1168 | Light weight, quick burn-through |
| 2 | 17-38 sec. | 0.1057 | Lightest weight tested |
| 3 | 24 sec. | 0.1278 | Modified Test Material 1, with additional foil layer |
| 4 | >10 min. | 0.1358 | Lighter than Test Material 4 |
| 5 | >10 min. | 0.1464 | Most effective in overall performance |

Test Materials:
1. Lightweight woven E-glass fiberglass fabric, with aluminum foil facing on one side, layered with 1" thick rotary fiberized fiberglass batting.
2. Lightweight woven E-glass fiberglass fabric, with aluminum foil facing on two sides, layered with 1" thick rotary fiberized fiberglass batting.
3. Lightweight woven E-glass fiberglass fabric, with two layers of aluminum foil facing on one side, layered with 1" thick rotary fiberized fiberglass batting.
4. 180 g/m$^2$ woven amorphous silica fabric, with aluminum foil facing on one side, layered with 1" thick rotary fiberized fiberglass batting.
5. 180 g/m$^2$ woven amorphous silica fabric, with aluminum foil facing on two sides, layered with 1" thick rotary fiberized fiberglass batting.

It can immediately be seen that the 180 g/m$^2$ woven amorphous silica fabric facing layer (200) experimental models performed far better than those where the facing layer (200) was formed of E-glass. Since it was apparent that at least some formulations of woven amorphous fabric facing layer (200) and lofted insulative layer (600) products had promise as commercial products, it was decided to undertake a study using an outside, third-party laboratory, under the FAA protocol, among the most stringent for products of this type. The results are presented in tabular form in Table 2:

TABLE 2

| Test Material | Burn-Through Time | Heat Flux Btu/ft2/sec | Material Weight lb/ft$^2$ | Comments |
| --- | --- | --- | --- | --- |
| 1 | 42 sec. | | 0.1168 | Light weight, quick burn-through |
| 2 | 34 sec. | | 0.1057 | Lightest weight tested |
| 3 | >6 min 30 sec, (6:30) | 0.85 | 0.1358 | Similar to, but lighter than Test Material 4 |
| 4 | >6 min 30 sec., (6:30) | 0.8 | 0.1464 | Most effective in overall performance |

Test Materials:
Lightweight woven E-glass fiberglass fabric, with aluminum foil facing on one side, layered with 1" thick rotary fiberized fiberglass batting.
2. Lightweight woven E-glass fiberglass fabric, with aluminum foil facing on two sides, layered with 1" thick rotary fiberized fiberglass batting.
3. Lightweight woven E-glass fiberglass fabric, with two layers of aluminum foil facing on one side, layered with 1" thick rotary fiberized fiberglass batting.
4. 180 g/m$^2$ woven amorphous silica fabric, with aluminum foil facing on one side, layered with 1" thick rotary fiberized fiberglass batting.

It was particularly noted that the woven amorphous silica fabric facing layer (200) products appeared to both satisfy the FAA requirements both as to burn-through times and acceptable heat flux levels.

Experimentation commenced to both further explore lighter-weight silica fiber materials and to undertake attempts to study and improve the performance of more conventional fiberglass products in these type applications, with variations of these materials in their most basic form. Lighter weight silica fabrics and treated fiberglass woven fabrics were also investigated.

The impervious membrane increases the acoustic performance of the composite. Both an aluminum foil impervious layer and a non-metallic impervious layer, PET (polyethylene terephthalate), were tested. Either a PET or foil membrane was laminated to the facing layer (200), to increase acoustic damping, as was done in the products tested in Tables 1 and 2.

In the modified ASTM E-119 test, an insulated box was constructed enclosing an open torch burner directly below an eight inch square hole at the top of the insulated box. Samples of insulative products were placed so that a turbulent flame of about 1900 to about 2000 degrees Fahrenheit directly contacted the primary facing surface (210) of the insulative product. A thermocouple was positioned three inches above the back side of the insulative product as a rough guide to heat flux, as transmitted temperatures of more than about 350 degrees were considered generally unsatisfactory, and likely to reflect heat fluxes that would fail to meet the FAA requirement restricting heat flux to below 2 Btu/ft$^2$-sec.

The initial insulative product tested in this protocol, as seen in Table 3, comprised a facing layer (200), that is, a layer facing the flame; formed from a plain weave (over and under weave) woven S-glass fabric, with a weight of 0.028 pounds per square foot. This fabric was woven from non-fire retardant, treated S-glass fibers in both the warp and woof of the fabric. S-glass, well-known in the art, has higher tensile strength, a higher modulus of elasticity, better temperature endurance, and much greater fatigue resistance than ordinary fiberglass; traditionally known in the art as "E-glass," because it was originally used in electrical applications. A membrane (400) comprising a 0.3 mil thick aluminum foil layer was adhered to the facing layer (200). In turn, the membrane (400) was overlaid with a lofted insulative layer (600) comprising 0.75 inch thick fiberglass batting.

The results are presented in tabular form as Table 3 below. In Table 3, and in all tables that follow, the following conventions are observed. "$T_{above}$" is the temperature observed at the thermocouple above the insulative product, i.e., a rough measure of heat flux, with temperature greater than about 350 degrees Fahrenheit being generally indicative of high heat flux. "$T_{furnace}$" indicates the temperature of the flame impacting the insulative structure. "Comments" include performance and other observations. Testing was generally carried out for at least five minutes, exceeding the FAA time requirements for a successful four minute test.

TABLE 3

| Test Number | Membrane | Material |
|---|---|---|
| 1 | Foil | 0.028 lb/ft$^2$ bidirectional plain weave S-glass fabric; laminated to 0.3 mil aluminum foil; overlaid with 0.75" fiberglass batt |

Test Data

| Time (Min) | $T_{above}$, ° F. | $T_{furnace}$, ° F. | Comments |
|---|---|---|---|
| 1 | | 1900 | Burn through at 33 seconds, but facing layer stayed largely intact |
| 2 | | 1860 | |
| 3 | | | Stable at 2 minutes 30 seconds (2:30) |
| 4 | | | |
| 5 | | | |

It can be seen that the product burned through quite rapidly, with burn through achieved in only 33 seconds, but the facing layer remained largely intact, suggesting that the facing layer (200) might have prospects for certain advantages in these applications, if thermal performance could be improved.

In contrast with the results shown in Table 2, in which E-glass fibers substantially melted away, the S-glass fibers in Test 3 remained substantially intact. While not wishing to be held to any particular theory, this led to the hypothesis that the mechanically linked structure found in woven fabrics, that is, where the fill and weave in a fabric are entwined around each other, contributed to a certain degree of mechanical strength even following thermal failure. This promised a definite and unexpected improvement over the prior art performance of ceramic paper based products, which were known to become brittle, especially when charred or otherwise exposed to high heat.

When the facing layer (200) was comprised of both S-glass and E-glass, the burn-through occurred even faster, which was well to be expected given the lower temperature endurance properties of E-glass, as can be seen in Table 4:

TABLE 4

| Test Number | Membrane | Material |
|---|---|---|
| A | Foil | S-glass & E-glass, plain weave, with S-glass in warp and E-glass in woof; laminated to 0.5 mil aluminum foil, overlaid with 0.5" thick fiberglass batting |

Test Data

| Time (Min) | $T_{above}$, ° F. | $T_{furnace}$, ° F. | Comments |
|---|---|---|---|
| 1 | | 1900 | Burn through in 12 seconds |
| 2 | | | |
| 3 | | | |
| 4 | | | |
| 5 | | | |

A 0.031 lb/ft$^2$ plain weave by which is meant an ordinary over and under weave, S-glass fabric, in a tighter weave and having a higher weight than the previous experimental model (See Table 1 above) was used. The denser material in the facing layer (200) inhibited destruction of the fiberglass insulative layer (600), but extremely high heat flux made overall results unsatisfactory. The results are shown in tabular form in Table 5:

TABLE 5

| Test Number | Membrane | Material |
|---|---|---|
| 5 | Foil | CLC 0.031 lb/ft$^2$ plain weave woven S-glass fabric facing layer; laminated to 0.3 mil aluminum foil; overlaid with fiberglass batting |

Test Data

| Time (Min) | $T_{above}$, ° F. | $T_{furnace}$, ° F. | Comments |
|---|---|---|---|
| 1 | | 1930 | |
| 2 | | | Stable at 2 minutes; but high heat flux |
| 3 | | | |
| 4 | 320 | | High heat flux, unable to keep furnace temperature up |
| 5 | 345 | 1780 | |

A slightly denser S-glass fabric as the facing layer (200) also gave poor results, with increased melting of the insulative layer (600) relative to that seen with the higher density S-glass material; as well as unacceptably high heat fluxes. Heat flux was so high that it was impossible to keep the flame at the intended temperature. The results are shown in tabular form in Table 6:

TABLE 6

| Test Number | Membrane | Material |
|---|---|---|
| 6 | Foil | 0.034 lb/ft$^2$ plain weave S-glass fabric facing layer; laminated to 0.3 mil aluminum foil; overlaid with fiberglass batting |

| Test Data | | | |
|---|---|---|---|
| Time (Min) | $T_{above}$, °F. | $T_{furnace}$, °F. | Comments |
| 1 | | 1900 | |
| 2 | | | Stable |
| 3 | | | High heat flux, unable to keep furnace temperature up |
| 4 | | | Fiberglass melted through, facing layer intact |
| 5 | | | Ran to 5:30 seconds without burn-through |

Figure 10:
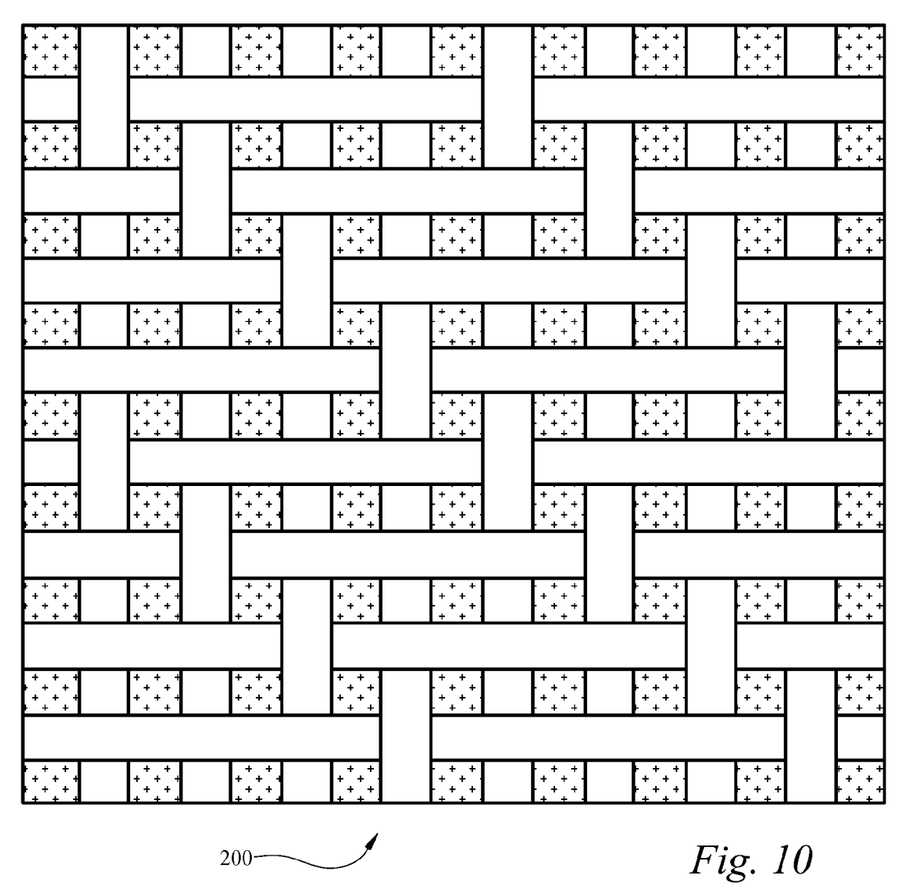
FIG. 10 is a top plan view of an embodiment of the instant invention, showing a 3×1 crowfoot weave pattern.
Figure 11:
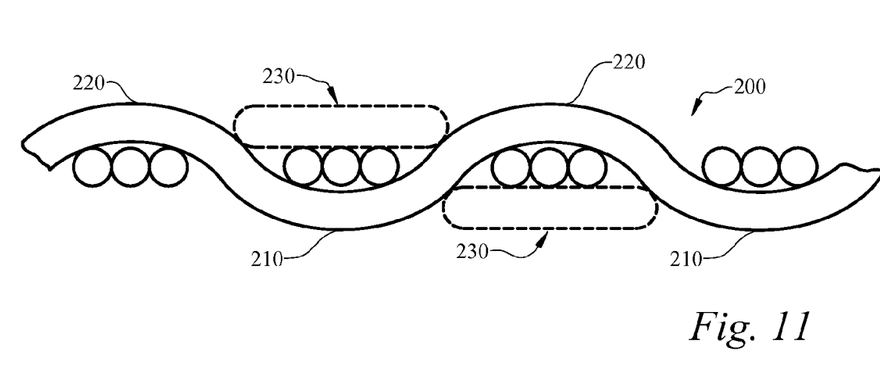
FIG. 11 is a cross sectional view of the embodiment of FIG. 10.

Experimentation was also undertaken with an alternative weave pattern, in particular, with a loose weave having increased surface irregularity, as seen in FIGS. 10-11. In particular, a "crowfoot weave" was tested.

In contrast to the normal over and under weave of basic fiberglass fabric construction, a crowfoot weave is a broken-twill weave 1-up and 3-down or 3-up and 1-down with two ends to the right and two ends to the left, commonly referred to as four-harness satin or broken crow (according to ASTM D 579). Crowfoot weaves offer more pliability and drapability than plain weave fabrics. The nature of crowfoot weave, seen in FIG. 10-11 creates a looser weave with greater surface irregularity (230), seen well in FIG. 11 than the surface irregularities (230), seen well in FIG. 9, seen in a plain weave, seen in FIG. 8.

Testing showed that the crowfoot weave material had sufficient mechanical strength to resist burn-through, but had an unacceptably high heat flux in the last minutes of the experiment. The results are shown in tabular form in Table 7:

TABLE 7

| Test Number | Membrane | Material |
|---|---|---|
| 7 | Foil | 0.026 lb/ft$^2$ crowfoot weave (3 × 1; H4) S-glass fabric facing layer; laminated to 0.3 mil aluminum foil; overlaid with fiberglass batting |

| Test Data | | | |
|---|---|---|---|
| Time (Min) | $T_{above}$, °F. | $T_{furnace}$, °F. | Comments |
| 1 | | 1900 | |
| 2 | 280 | | High heat flux with lots of fiberglass melting |
| 3 | 280 | | High heat flux, unable to keep furnace temperature up |
| 4 | 350 | | Fiberglass melted through, facing layer intact |
| 5 | 370 | | Ran to 5:30 without burn-through |

A two-fiber weave, in which the warp and fill were composed of differing materials, was tested. Specifically a fabric formed of S-glass fibers woven alternately with carbon fibers was tested. The results are shown in tabular form in Table 8:

TABLE 8

| Test Number | Membrane | Material |
|---|---|---|
| 8 | Foil | 0.032 lb/ft$^2$ crowfoot weave untreated plain weave fabric facing layer, untreated S-Glass Fiber and Carbon Fiber overlaid on 0.3 mil aluminum foil; overlaid with fiberglass batting |

| Test Data | | | |
|---|---|---|---|
| Time (Min) | $T_{above}$, °F. | $T_{furnace}$, °F. | Comments |
| 1 | | 1900 | Burn through at one minute |
| 2 | | | Carbon fibers burned away |
| 3 | | | |
| 4 | | | |
| 5 | | | |

In order to improve the performance of S-glass fabrics, experiments were performed to raise the softening point of the S-glass facing layer (200). Certain methods of doing so are detailed in U.S. Pat. No. 5,284,700 ('700), the teachings of which are incorporated herein by reference as though fully rewritten.

As taught in the '700 teachings, it has been discovered that when an effective amount of a phosphate-containing compound is brought into close proximity and/or contact with the surface of various mineral, glass, and other fibers, and when the thus treated fiber is exposed to temperatures well in excess of those which would normally melt an untreated fiber, the fiber nonetheless surprisingly withstands such elevated temperatures for significant time periods without melting.

Certain phosphate-containing compounds will form a protective high-temperature coating or layer on the fiber surfaces when the treated fiber (i.e. a fiber having the phosphate-containing compounds in close proximity to and/or in contact with the fiber's surface) is exposed to thermal reaction conditions.

Although not wishing to be bound to any particular theory, it is surmised that some of the phosphate-containing compounds which may be employed in the present invention are those which release phosphoric acid upon thermal degradation. This released phosphoric acid is believed to migrate to the surfaces of mineral fibers in close proximity and/or contact therewith where it reacts with the silica constituent of the glass to form a protective silicate phosphate ceramic coating or layer on the mineral fiber surfaces.

In fact, for certain phosphate-containing compounds, this migration phenomenon has been observed to, in effect, spread the protective ceramic coating to mineral fibers not actually in contact with, but in sufficiently close proximity to, the phosphate-containing compounds. It is this protective ceramic coating (as confirmed by X-ray diffraction analysis) that apparently renders the fibers surprisingly able to withstand the temperatures of an open flame for a significant period of time. That is, the fibers do not "burn through" when subjected to an open flame. Thus, the products of this invention exhibit "fire resistant" properties—that is, the products of this invention do not melt when exposed to open flame (i.e., temperatures normally melting untreated mineral fiber products). This property of the present invention is to be contrasted with "fire-retardant" properties—that is, products which merely inhibit flame spread, but do not necessarily resist flame burn through.

It is also surmised that phosphorous compounds which do not release phosphoric acid upon thermal degradation, offer protection of fibers via formation of a high melting temperature phosphate surface coating or layer. In the case of some phosphate-containing compounds, it may be possible that a silicate phosphate ceramic and/or a high melting temperature phosphate coating is formed so as to impart fire-resistance properties to the mineral fibers. It is additionally surmised, in the instant invention, that some portion of the phosphate containing coating on the facing layer (200) may vaporize under fire conditions, and migrate to the closely associated insulative layer (600); where it may increase the fire resistance of that insulative layer (600).

The phosphate-containing compound can be brought into close proximity and/or contact with mineral fibers in any convenient manner, such as roll coating, spraying, dipping, sprinkling or padding. For example, when the mineral fibers are in the form of a glass wool, an aqueous mixture of the phosphate-containing compound may conveniently be sprayed via a conventional spray ring onto the glass fibers prior to their collection on a conveyor to form the glass wool. Also, in the particular case of glass wool, the phosphate-containing compound may be applied onto the glass fibers concurrently with an aqueous glass wool binder solution, in which case, the phosphate-containing compound is added to the binder solution prior to application.

In the instant invention, a formulation of dicalcium phosphate (DCP) suspended in an acrylic polymer coating was used. The woven fabric was dipped into the coating and subsequently fed through nip rollers to further impregnate the fibers in the fabric with the coating.

The results are shown in tabular form in Table 9:

TABLE 9

| Test Number | Membrane | Material |
|---|---|---|
| 9 | Foil | 0.038 lb/ft$^2$ plain weave DCP treated bidirectional S-glass fabric (S-glass in both fill and weave) facing layer; laminated to 0.3 mil aluminum foil; overlaid with fiberglass batting |

Test Data

| Time (Min) | $T_{above}$, °F. | $T_{furnace}$, °F. | Comments |
|---|---|---|---|
| 1 | | 1932 | Facing remained intact with no cracks or breaks |
| 2 | 220 | | Lower heat flux than with untreated S-glass |
| 3 | | | |
| 4 | | | |
| 5 | 281 | 1852 | Ran to 5:30 without burn-through |

An experiment was performed using a facing formed of S-glass fibers woven alternately with carbon fibers, coated with the DCP coating. The results are shown in tabular form in Table 10:

TABLE 10

| Test Number | Membrane | Material |
|---|---|---|
| 11 | Foil | 0.056 lb/ft$^2$ plain weave DCP treated, S-Glass Fiber and Carbon Fiber facing layer, laminated to 0.3 mil aluminum foil; overlaid with fiberglass batting |

Test Data

| Time (Min) | $T_{above}$, °F. | $T_{furnace}$, °F. | Comments |
|---|---|---|---|
| 1 | | 1900 | |
| 2 | | | Much smoke |
| 3 | | | Carbon fiber much less visible at end of test |
| 4 | | | High heat flux, fiberglass melted in several areas |
| 5 | | | Ran to 5:30 without burn-through |

In particular, without intending to be bound by any particular theory, it is hypothesized that a increased surface irregularity weave, in particular a crowfoot weave, such as seen in FIGS. 10 and 11, permits more of the coating material to be held in closer proximity to the fibers in the woven fabric.

An S-glass, crowfoot weave, facing layer (200) treated with DCP was tested. The results are shown in tabular form in Table 11:

TABLE 11

| Test Number | Membrane | Material |
|---|---|---|
| 12 | Foil | CLC 0.043 lb/ft$^2$ crowfoot weave DCP treated bidirectional S-glass fabric facing layer; laminated to 0.3 mil aluminum foil; overlaid with fiberglass batting |

Test Data

| Time (Min) | $T_{above}$, °F. | $T_{furnace}$, °F. | Comments |
|---|---|---|---|
| 1 | | 1910 | |
| 2 | | | Stable at 2 minutes |
| 3 | 230 | | Good heat flux, Fiberglass melted at 3 minutes 30 seconds |
| 4 | 230 | | Good heat flux, foil intact at center |
| 5 | 250 | 1835 | Good heat flux, Ran to 5:30 seconds without burn-through |

Further tests were conducted using amorphous silica fabric as the base for the burn-through resistant facing. The fabric, CLC 6079 first pass, was provided by the Cleveland Laminating Corp., Cleveland, Ohio. The facing layer (200) comprised a 180 g/m$^2$ woven amorphous silica fabric. A membrane (400) comprising a 0.3 mil thick aluminum foil layer laminated to the facing layer (200). The lofted insulative layer (600) was then overlaid on the membrane (400), the insulative layer (600) comprising a 0.75 inch thick fiberglass batting. The results are shown in tabular form in Table 12:

TABLE 12

| Test Number | Membrane | Material |
|---|---|---|
| 2 | Foil | 180 g/m$^2$ woven amorphous silica fabric facing layer; laminated to 0.3 mil aluminum foil; overlaid with 0.75" fiberglass batting |

Test Data

| Time (Min) | $T_{above}$, °F. | $T_{furnace}$, °F. | Comments |
|---|---|---|---|
| 1 | | 1900 | |
| 2 | | | |
| 3 | | | Fiberglass batting melted at 2 minutes 40 seconds, fabric remained intact |
| 4 | 280 | | |
| 5 | 290 | | Ran to 5 minutes 30 seconds without burn-through |

It was subsequently discovered that laminating a dimensionally stable membrane such as foil or PET (polyethylene terephthalate) had ramifications far beyond the provision of a suitable acoustic barrier. A problem well-known in the art for both woven fabrics and lofted products, especially lofted fiberglass products, is their tendency to both "sag" and "creep." Because fiberglass and similar fabrics are mechanically intertwined in a somewhat loose fashion, these fabrics tend to creep. This can easily be understood by placing a section of woven fiberglass fabric on an inclined surface; the fabric will tend to "creep" under the force of gravity downwards. Similarly, because lofted fiberglass products, being so highly composed of air, will "sag" around mechanical obstacles and will tend to collapse on its own. Lamination of the facing layer (200) to a dimensionally stable material, such as foil or PET, caused both the facing layer (200) and the lofted insulative layer (600) to be much easier to handle and to die-cut. This combination of a dimensionally stable layer (400) laminated between two dimensionally unstable layers (200) and (600) promised unexpected advantages both for commercial fabrication and installation. In addition, it was found that the dimensionally stable membrane (400) provided an improved adhesive substrate.

In an effort to reduce the weight of the composite, we tested a woven amorphous silica fabric facing layer (200) having a lower weight than previously tested facing layers. The results are shown in tabular form in Table 13:

TABLE 13

| Test Number | Membrane | Material |
|---|---|---|
| F | Foil | 140 g/m² woven amorphous silica fabric, plain weave; laminated to 0.3 mil aluminum foil; overlaid with 0.75" fiberglass batting. |

| Test Data | | | |
|---|---|---|---|
| Time (Min) | $T_{above}$, °F. | $T_{furnace}$, °F. | Comments |
| 1 | | 1900 | |
| 2 | | | |
| 3 | | | One spot melted through fiberglass batting at approx. 4 minutes |
| 4 | | | |
| 5 | 165 | | Ran to 5 minutes 30 seconds without burn-through |

Aircraft insulations must function in a wide variety of humidity conditions, ranging from very low humidity levels to very high humidity levels. Additionally, any moisture that condenses on insulation at low temperatures will increase the weight of the insulation and may cause long-term degradation of the insulation. As a result, it is desired to incorporate various water repellant coatings into such products. Therefore, experimentation was continued using various commercial water repellants including various amounts of aluminum, zinc, zircon, and vinyl acetate homopolymers.

A 180 g/m² woven amorphous silica fabric facing layer (200) also performed well when treated with a water-repellant. The results are shown in tabular form in Table 14:

TABLE 14

| Test Number | Membrane | Material |
|---|---|---|
| G | Foil | 180 g/m² woven amorphous silica fabric, plain weave, treated with water repellant; laminated to 0.3 mil aluminum foil; overlaid with 0.75" fiberglass batting. |

TABLE 14-continued

| Test Data | | | |
|---|---|---|---|
| Time (Min) | $T_{above}$, °F. | $T_{furnace}$, °F. | Comments |
| 1 | | 1900 | Water repellant flamed on start-up, smoked for approx. 15 secs. |
| 2 | | | |
| 3 | | | |
| 4 | 260 | 1820 | One spot melted through the fiberglass batting at approx. 4 minutes |
| 5 | | | Ran to 5:30 without burn-through |

A 140 g/m² woven amorphous silica fabric was also tested with the water repellant treatment and results are shown in tabular form in Table 15:

TABLE 15

| Test Number | Membrane | Material |
|---|---|---|
| H | Foil | 140 g/m² woven amorphous silica fabric, plain weave with water repellant treatment; laminated to 0.3 mil aluminum foil; overlaid with 0.5" fiberglass batting. |

| Test Data | | | |
|---|---|---|---|
| Time (Min) | $T_{above}$, °F. | $T_{furnace}$, °F. | Comments |
| 1 | | 1900 | |
| 2 | | | |
| 3 | | | Fiberglass melted in two places at approx. 2:45 |
| 4 | | | |
| 5 | | | Ran to 5:30 without burn-through |

A 140 g/m² woven amorphous silica fabric was water-retardant treated with a combination of aluminum, zinc, and zircon; and paired with fiberglass batting for experimental purposes. This again showed good results, as seen below in Table 16:

TABLE 16

| Test Number | Membrane | Material |
|---|---|---|
| 14 | Foil | 140 g/m² woven amorphous silica fabric with EVEM*; laminated to 0.3 mil aluminum foil; overlaid with 0.75" fiberglass batting |

| Test Data | | | |
|---|---|---|---|
| Time (Min) | $T_{above}$, °F. | $T_{furnace}$, °F. | Comments |
| 1 | | 1900 | Heavy smoke in first 45 seconds |
| 2 | | | |
| 3 | | | |
| 4 | | | |
| 5 | | | Ran to 5 minutes 30 seconds without burn-through |

(*EVEM = aluminum, zinc, zircon, and vinyl acetate homopolymers)

Therefore, it was also concluded from this, and other tests not reported here, that a plurality of commercial water-retardant might be effective in decreasing water uptake of the structure (100), without adversely affecting thermal performance.

The 180 g/m² amorphous silica fabric, laminated to a 0.3 mil foil, was laminated to, rather than simply overlaid with the insulative layer (600). The results are shown in tabular form in Table 17:

TABLE 17

| Test Number | Membrane | Material |
|---|---|---|
| 3 | Foil | 180 g/m² woven amorphous silica fabric facing layer; laminated to 0.3 mil aluminum foil; laminated to 0.75" fiberglass batting |

Test Data

| Time (Min) | $T_{above}$, °F. | $T_{furnace}$, °F. | Comments |
|---|---|---|---|
| 1 | | 1900 | |
| 2 | | | Fiberglass batting melted at 1:30 seconds, fabric remained intact |
| 3 | | | |
| 4 | | | |
| 5 | | | Ran to 5:30 seconds without burn-through |

The results obtained when the facing was laminated to the batting are similar to those seen when the batting is simply overlaid on the facing.

In another experiment, a 140 g/m² woven amorphous silica fabric facing layer (200) was combined with a lofted insulative layer (600) formed of a proprietary blend of fiberglass and polyester fibers (VERSAMAT™ 3000; produced by The Owens Corning Co., Inc. Toledo, Ohio), showed promise. The results are shown in tabular form in Table 18:

TABLE 18

| Test Number | Membrane | Material |
|---|---|---|
| I | Foil | 140 g/m² woven amorphous silica fabric, plain weave with water repellant treatment; laminated to 0.3 mil aluminum foil; overlaid with 30 g/ft² VERSAMAT 3000 |

Test Data

| Time (Min) | $T_{above}$, °F. | $T_{furnace}$, °F. | Comments |
|---|---|---|---|
| 1 | | 1900 | |
| 2 | | | |
| 3 | | | VERSAMAT split at approx. 1:30, but didn't flame |
| 4 | | | |
| 5 | | | Ran to 5 minutes 30 seconds without burn-through |

As has been shown, woven amorphous silica fabric of both 140 g/m² and 180 g/m² performed generally well with a plurality of insulative layers (600); indicative of the high utility of silica fabric for this application.

The flexible composite multiple layer fire-resistant insulation structure of the instant invention enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

We claim:

1. A flexible composite multiple layer fire-resistant insulation structure, comprising:
    at least one woven fabric facing layer having a primary facing surface and a secondary facing surface;
    at least one dimensionally stable membrane having a primary membrane surface and a secondary membrane surface, wherein at least a portion of the secondary facing surface is attached to the primary membrane surface;
    at least one lofted insulative layer having a primary insulative surface and a secondary insulative surface, wherein at least a portion of the secondary membrane surface is attached to the primary insulative surface of the lofted insulative layer; and
    a sheath configured to at least partially encase the at least one woven fabric facing layer, the at least one dimensionally stable membrane, and the at least one lofted insulative layer, wherein the sheath is laminated by heat to the woven fabric facing layer; and
    wherein the at least one dimensionally stable membrane is positioned between the at least one woven fabric facing layer and the at least one lofted insulative layer.

2. The structure of claim 1, wherein at least about 10% of the secondary facing surface is attached to the primary membrane surface.

3. The structure of claim 1, wherein at least about 30% of the secondary facing surface is attached to the primary membrane surface.

4. The structure of claim 1, wherein at least about 70% of the secondary facing surface is attached to the primary membrane surface.

5. The structure of claim 1, wherein the at least one woven fabric facing layer further comprises amorphous silica glass.

6. The structure of claim 1, wherein the at least one woven fabric facing layer further comprises S-glass including a fire resistive treatment.

7. The structure of claim 1, wherein the at least one woven fabric facing layer has a weave pattern further comprising at least a 2×1 weave pattern.

8. The structure of claim 1, wherein the at least one woven fabric facing layer further includes a fire resistive treatment.

9. The structure of claim 8, wherein the fire resistive treatment further comprises a phosphate containing compound.

10. The structure of claim 9, wherein the phosphate containing compound further comprises dicalcium phosphate.

11. The structure of claim 1, further comprising an adhesive layer adhering at least a portion of the secondary membrane surface to the primary insulative surface.

12. The structure of claim 1, wherein the at least one membrane further comprises at least one metallic sheet layer.

13. The structure of claim 1, wherein the at least one membrane further comprises at least one polymeric layer.

14. The structure of claim 1, wherein the at least one lofted insulative layer is a fiberglass material.

15. The structure of claim 1, wherein the at least one lofted insulative layer is a foam material.

16. The structure of claim 1, wherein the at least one woven fabric facing layer comprises a bidirectional woven fabric having glass fibers running in both directions of the weave.

17. The structure of claim 1, wherein the at least one woven fabric facing layer comprises a bidirectional woven fabric having a crowfoot weave.

18. The structure of claim 1, wherein the structure is configured such that a heat exposed side of the structure is the primary facing surface of the at least one woven fabric facing layer.

19. The structure of claim 1, wherein the at least one woven fabric facing layer comprises a woven amorphous silica fabric, the at least one dimensionally stable membrane comprises a metallic sheet, and the at least one lofted insulative layer comprises a fiberized fiberglass batting.

20. The structure of claim 19, wherein the weight of the woven amorphous silica fabric is about 180 g/m$^2$.

21. The structure of claim 1, wherein the weight of the structure is less than about 0.15 lb/ft$^2$.

22. A multiple layer fire-resistant insulation structure, comprising:
- a first layer comprising a woven glass fiber fabric having a primary facing surface and a secondary facing surface;
- a second layer comprising a dimensionally stable membrane having a primary membrane surface and a secondary membrane surface; and
- a third layer comprising an insulation material having a primary insulative surface and a secondary insulative surface; and
- wherein the second layer is positioned between the first layer and the third layer and is at least partially attached to both the first layer and third layer; the secondary facing surface is at least partially attached to the primary membrane surface; and the secondary membrane surface is at least partially attached to the primary insulative surface; and
- wherein the primary facing surface is at least partially attached to a fourth layer comprising a dimensionally stable membrane, and wherein the fourth layer is at least partially attached to a fifth layer comprising an insulation material.

23. A multiple layer fire-resistant insulation structure, comprising:
- a first layer comprising a woven glass fiber fabric having a primary facing surface and a secondary facing surface;
- a second layer comprising a dimensionally stable membrane having a primary membrane surface and a secondary membrane surface; and
- a third layer comprising an insulation material having a primary insulative surface and a secondary insulative surface; and
- wherein the second layer is positioned between the first layer and the third layer and is at least partially attached to both the first layer and third layer; the secondary facing surface is at least partially attached to the primary membrane surface; and the secondary membrane surface is at least partially attached to the primary insulative surface; and
- wherein the primary facing surface is at least partially attached to a fourth layer comprising an insulation material.

* * * * *